United States Patent
Birkmeier

(10) Patent No.: US 12,356,195 B2
(45) Date of Patent: Jul. 8, 2025

(54) RE-ESTABLISHING A CONNECTION BETWEEN A USER CONTROLLER DEVICE AND A WIRELESS DEVICE

(71) Applicant: Telefonaktiebolaget LM Ericsson (publ), Stockholm (SE)

(72) Inventor: Martin Birkmeier, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 968 days.

(21) Appl. No.: 16/643,891

(22) PCT Filed: Sep. 8, 2017

(86) PCT No.: PCT/EP2017/072589
§ 371 (c)(1),
(2) Date: Mar. 3, 2020

(87) PCT Pub. No.: WO2019/048052
PCT Pub. Date: Mar. 14, 2019

(65) Prior Publication Data
US 2020/0275280 A1 Aug. 27, 2020

(51) Int. Cl.
*H04L 29/06* (2006.01)
*H04W 12/06* (2021.01)
*H04W 12/122* (2021.01)
*H04W 12/128* (2021.01)
*H04W 76/19* (2018.01)

(52) U.S. Cl.
CPC ......... *H04W 12/122* (2021.01); *H04W 12/06* (2013.01); *H04W 12/128* (2021.01); *H04W 76/19* (2018.02)

(58) Field of Classification Search
CPC ... H04W 12/122; H04W 76/19; H04W 12/06; H04W 12/128
See application file for complete search history.

(56) References Cited

U.S. PATENT DOCUMENTS

| | | |
|---|---|---|
| 8,561,177 B1 * | 10/2013 | Aziz ...................... G06F 21/56 726/22 |
| 2010/0162396 A1 | 6/2010 | Liu et al. |
| 2012/0151033 A1 * | 6/2012 | Baliga ................ H04W 12/122 709/224 |

(Continued)

*Primary Examiner* — Wasika Nipa
(74) *Attorney, Agent, or Firm* — COATS & BENNETT, PLLC

(57) ABSTRACT

A method in a network node is provided for re-establishing a connection between a user controller device and a wireless device in a wireless communications network, wherein the wireless device has been corrupted such that it will only accept communications which appear to originate from an attacking controller device. The method comprises obtaining attacker information based on intercepted communications between the wireless device and the attacking controller device, wherein the attacker information can be used to modify communications such that modified communications mimic communications from the attacking controller device. The method comprises modifying user communications from the user controller device to the wireless device with the attacker information. The method comprises sending the modified user communications to the wireless device.

20 Claims, 7 Drawing Sheets

(56) References Cited

U.S. PATENT DOCUMENTS

| | | | | |
|---|---|---|---|---|
| 2015/0271194 A1* | 9/2015 | Szucs | ............... | H04W 12/06 |
| | | | | 726/23 |
| 2016/0255106 A1* | 9/2016 | Maria | ............... | H04L 63/10 |
| | | | | 726/4 |
| 2016/0330172 A1* | 11/2016 | Muttik | ............... | G06F 21/6245 |
| 2017/0189803 A1* | 7/2017 | Atwell | ............... | A63H 17/26 |
| 2017/0311185 A1* | 10/2017 | Yamada | ............... | H04W 36/0079 |

* cited by examiner

RE-ESTABLISHING A CONNECTION BETWEEN A USER CONTROLLER DEVICE AND A WIRELESS DEVICE

TECHNICAL FIELD

The embodiments described herein relate to re-establishing a connection between a user controller device and a wireless device in a wireless communications network. For example, the wireless device may have been corrupted such that it will only accept communications which appear to originate from an attacking controller device.

BACKGROUND

Stand-alone cellular devices, like sensors or other Internet of Things (IoT) devices may be deployed within a network, and are often connected through the radio network to a server. A user can access and use the devices through this server. The user relies on this means of connection, and often the only alternative, if the connection is lost, is to physically get to the device and establish a physical connection.

The user and the user controller device, as a non-operator, have access to the core network and its features through the operator's Internet Protocol (IP) Services. The operator's IP services pass communications through the core network to the deployed wireless devices as shown for example in FIG. 1.

FIG. 1 illustrates an example network 100. The user 101 is operating a user controller device 102 which is capable of controlling a wireless device 103. The wireless device 103 may be a stand-alone cellular device such as a sensor or other remote device. The user controller device 102 is connected to the core network 104 via the operator's IP services 105. The user controller device 102 connects over the internet 106 via an Access Point Name (APN) gateway 107 to the operator's IP services 105.

The core network 104 comprises a Packet Data Network Gateway (PGW) 108 which is a gateway which acts as an "anchor" of mobility between Long Term Evolution (LTE) technologies and other packet data networks. Data connections exist between the operator's IP services 105 and the PGW 108.

The core network 104 further comprises at least one Serving Gateway (SGW) 109. The core network 104 may also comprise a Mobility Management Entity (MME) 110 and a Home Subscriber Server (HSS) 111 as well as a Policy and Charging Rules Function (PCRF) 112. These network nodes may perform control mechanisms for the other nodes in the network. Any signaling to control the network may therefore occur between these various nodes in the core network.

The wireless device 103 may be connected to the core network 104 via a base station, for example base station 113.

It will be appreciated that the embodiments herein are described for LTE/4G networks. However, the methods and apparatus of the present disclosure may be equally applied within any suitable network.

FIG. 2 illustrates a lost connection between the user controller device 102 and the wireless device 103. In this example, the wireless device 103 has been corrupted by an attacker 201.

If an attacker 201 can corrupt the wireless device 103 and reconfigure the wireless device's system, the attacker 201 may be able to use an attacking controller device 202 to change the termination point of the data connection to an attacking server 203, rather the than wireless device 103 using the user's own server 204. If the attack is more specialised, the attacker 201 could even reconfigure the wireless device 103 to ignore signals received from any other devices except the attacker's own. For example, the attacker 201 may program the wireless device 103 to accept only signals from his IP and Port. In this situation, the user 101 may be locked out of his own wireless device 103. The user 101 may not be able to regain control, due to the inability to connect to his wireless device 103.

In order to regain control the user 101 may have to physically access the wireless device 103 and regain control. This may be time consuming if the wireless device 103 is located remotely from the user 101 and the user controller device 102. There also may be a large number of wireless devices 103, many of which may have been subject to an attack, which may then require the user 101 to access each wireless device 103 individually in order to regain control. In any case, the effort to regain control of the wireless device(s) 103 consumes resources.

SUMMARY

According to the present disclosure there is provided a method in a network node of re-establishing a connection between a user controller device and a wireless device in a wireless communications network, wherein the wireless device has been corrupted such that it will only accept communications which appear to originate from an attacking controller device. The method comprises obtaining attacker information based on intercepted communications between the wireless device and the attacking controller device, wherein the attacker information can be used to modify communications such that modified communications mimic communications from the attacking controller device. The method comprises modifying user communications from the user controller device to the wireless device with the attacker information. The method comprises sending the modified user communications to the wireless device.

According to another aspect, there is provided a network node configured to re-establish a connection between a user controller device and a wireless device in a wireless communications network, wherein the wireless device has been corrupted such that it will only accept communications which appear to originate from an attacking controller device. The network node comprises an obtaining module configured to obtain attacker information based on intercepted communications between the wireless device and the attacking controller device, wherein the attacker information can be used to modify communications such that modified communications mimic communications from the attacking controller device. The network node comprises a modification module configured to modify user communications from the user controller device to the wireless device with the attacker information. The network node comprises a transmission module configured to send the modified user communications to the wireless device.

According to another aspect, there is provided a network node for re-establishing a connection between a user controller device and a wireless device in a wireless communications network, wherein the wireless device has been corrupted such that it will only accept communications which appear to originate from an attacking controller device. The network node comprises a processor and a memory, said memory containing instructions executable by said processor. The processor is operative to obtain attacker information based on intercepted communications between the wireless device and the attacking controller device, wherein the attacker information can be used to modify communications such that modified communications mimic communications from the attacking controller device. The processor is operative to modify user communications from the user controller device to the wireless device with the attacker information. The processor is operative to send the modified user communications to the wireless device.

BRIEF DESCRIPTION OF THE DRAWINGS

For a better understanding of the present disclosure, and to show how it may be put into effect, reference will now be made, by way of example only, to the accompanying drawings, in which:—

DESCRIPTION

Figure 1:
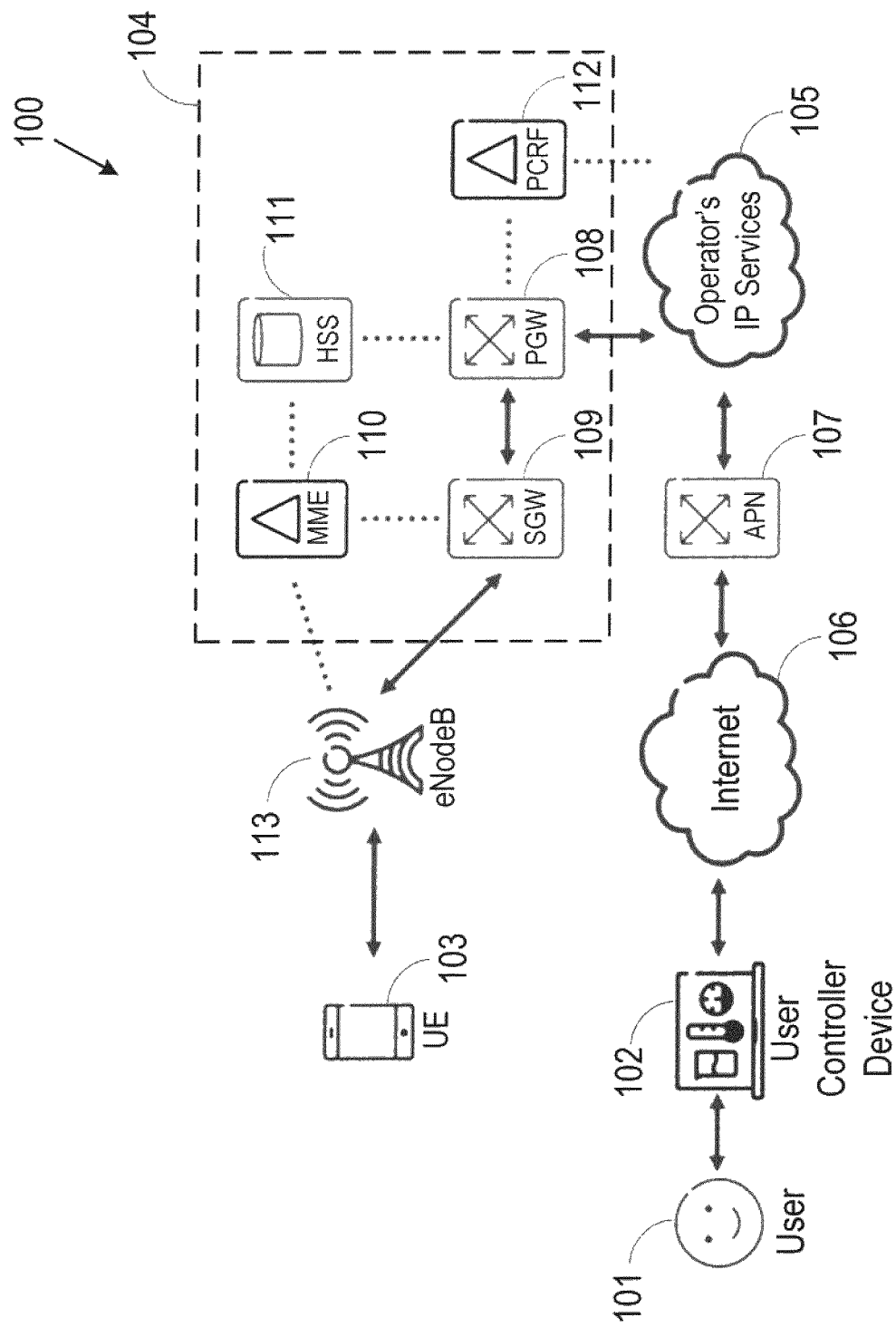
FIG. 1 illustrates a network according to some embodiments.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as to not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed, or cloud based. Moreover, the term "processor" or "controller" also refers to other hardware capable of performing such functions and/or executing software, such as the example hardware recited above.

Although the description is given for a wireless device, it should be understood by those skilled in the art that "wireless device" is a non-limiting term comprising any mobile or wireless device, terminal, user equipment (UE) or node equipped with a radio interface allowing for at least one of: transmitting signals in uplink (UL) and receiving and/or measuring signals in downlink (DL). A wireless device herein may comprise a wireless device (in its general sense) capable of operating or at least performing measurements in one or more frequencies, carrier frequencies, component carriers or frequency bands. It may be a "UE" operating in single, or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target devices, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

The present disclosure provides methods and apparatus for re-establishing a connection between a user controller device and a wireless device in a wireless communications network, for example wherein the wireless device has been corrupted such that it will only accept communications which appear to originate from an attacking controller device.

Figure 3:
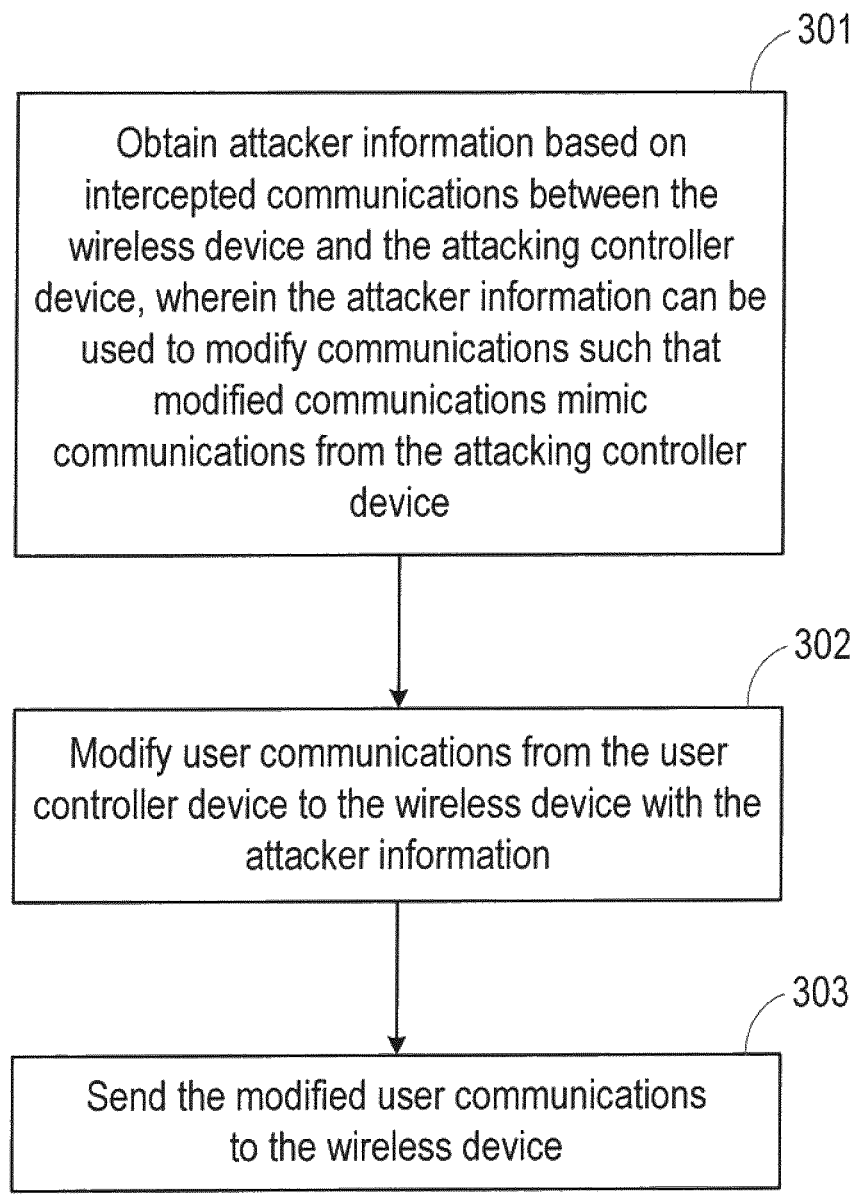
FIG. 3 illustrates a method in a network node of re-establishing a connection between a user controller device and a wireless device in a wireless communications network.

FIG. 3 illustrates a method in a network node of re-establishing a connection between a user controller device and a wireless device in a wireless communications network. In these examples, the wireless device has been corrupted such that it will only accept communications which appear to originate from an attacking controller device.

In step 301, the network node obtains attacker information based on intercepted communications between the wireless device and the attacking controller device, wherein the attacker information can be used to modify communications such that modified communications mimic communications from the attacking controller device. For example, communications between the wireless device and the attacking controller device may be intercepted at some predetermined network gateway. For example, the predetermined network gateway may be the device isolator, DI-Box 401, described later with reference to FIGS. 4 and 5.

In step 302 the method in the network node modifies user communications from the user controller device to the wireless device with the attacker information, i.e. to provide modified user communications.

In step 303, the method in the network node sends the modified user communications to the wireless device.

In some examples, one or more steps of the method of FIG. 3 may be performed by a user controller device such as the user controller device 102 in FIG. 2, or in a Packet Data Network Gateway (PGW) which may be configured as a device Isolator box (DI-Box) as will be illustrated later in FIG. 4. In some embodiments, one or more steps of the method may be performed by other nodes in the network, for example a device isolator mask node (DI-Mask) as described below with reference to FIG. 5.

Where the method is performed by a user controller device 102, the intercepted communications may be intercepted at a node within the network, for example at a PGW. The intercepted communications may then be transmitted to the user controller device 102 which may analyze the communications and derive the attacker information. Alternatively, the intercepted communications may be analyzed by some third party, or a different node in the network, to derive the attacker information before sending the attacker information to the user controller device 102.

In some embodiments, the method may further comprise intercepting communications between the wireless device 103 and the attacking controller device 202, for example, when the method of FIG. 3 is performed by a predetermined network gateway, for example, a Device Isolator Box (DI-Box) as described with reference to FIGS. 4 and 5. For example, the interception of communication may be performed by routing all communications to and from the wireless device 103 to the predetermined network gateway.

Figure 4:
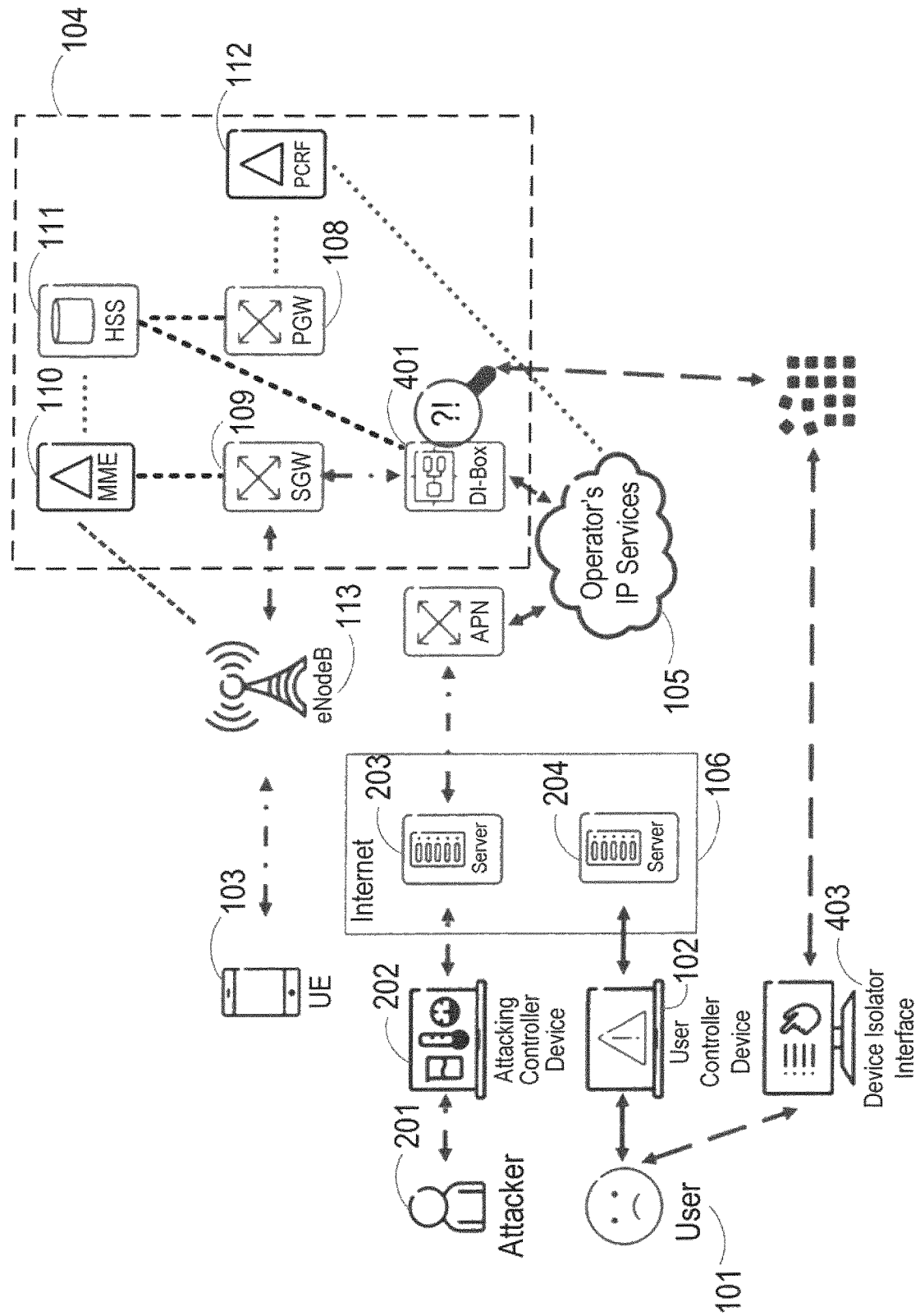
FIG. 4 illustrates an example of a communications network according to some embodiments.

For example, the predetermined network gateway may be a DI-Box 401 as illustrated in FIG. 4. The method of FIG. 3 may in some embodiments be performed in the predetermined network gateway, such as the DI-Box 401 illustrated in FIG. 4.

The attacker information may comprise information relating to a source address, for example an IP, Port and/or Mac Address, of the attacking controller device 202. The knowledge of the source address of the attacking controller device 202 may then be used to modify other communications such that they appear to any receiving device to have originated at the attacking controller device 202. Such modifications may therefore cause the modified communications to mimic communications from the attacking controller device 202.

Alternatively, the communications between the attacking controller device 202 and the wireless device 103 may be secured by specific content, for example usernames, passwords and/or a shared secret. Analysis of the intercepted communications, using for example a Deep Packet Inspection feature, may allow for the extraction of such secured specific content which may then be used to modify communications such that they mimic this specific content.

For example, if the communication between the attacking controller device 202 and the wireless device 103 is encrypted and secured against any man-in-the-middle attack, for example using Transport Layer Security (TLS) and certificates through a certificate authority (CA), countering this encryption may be difficult. However, due to the interception of the communications between the attacking controller device 202 and the wireless device 103, even the validation of the certificates may be manipulated and used to modify other communications. For example step 301 may comprise analysing the intercepted communications to determine an encryption model to be used to mimic attacking communications from the attacking controller device. The attacker information may therefore comprise an encryption model.

Some methods of tamper detection, based on the monitoring of discrepancies of the response times between the attacking controller device 202 and the wireless device 103, could result in the modification of the communications not effectively masking the communications. However, given that it is possible to delay communications at the predetermined gateway before any isolation is initiated, the tamper detection may be deceived.

For example, by delaying communications before switching over the communications, the mean values and expected values which are expected might be changed. For example if the mean response time is measured over an hour, delaying the response times/message for an hour by some time, changes the mean time and the expected threshold. This can be performed if such a time related monitoring is active. In some embodiments, by "loosening" the expected timings by a certain amount, this can create enough space for the interception/isolation not to be detected.

Depending on the quality of the encryption and the implementation of the communication, it might not be possible to decrypt the content of the intercepted communications or to initiate a man-in-the-middle attack. Therefore, the user may in some cases be unable to regain the control without physically accessing the wireless device 103

Returning to FIG. 3, in some embodiments, including where the connection between the wireless device 103 and the user controller device 102 cannot be re-established, the method may further comprise terminating the attacking communications between the wireless device 103 and the attacking controller device 202 at the predetermined gateway.

In some embodiments however, the network node may identify, in the intercepted communications, a trigger signal necessary to maintain proper operation of the wireless device 103. In other words, the attacking controller device 202 may have corrupted the wireless device 103 in such a way that, if the wireless device 103 no longer receives this trigger signal, for example a kill signal, the wireless device 103 may be rendered destroyed or damaged. Therefore, in some embodiments, the network node may transmit a signal derived from the trigger signal to the wireless device 103. For example, the trigger signal may be recreated at the user controller device 102 and modified such that it appears to have originated at the attacking controller device 202. Alternatively, the network node may forward the trigger signal to the wireless device 103.

In some embodiments, the network node may be unable to determine whether a trigger signal is present in the attacking communications. In this scenario it may be advantageous to maintain communications between the attacking controller device 202 and a clone of the wireless device 103 (i.e. a virtual wireless device), in case there is a form of trigger signal within the attacking communications. In other words, the attacking controller device 202 communicates with a virtual clone of the wireless device to keep motivated to send the "idle" signal. The DI-Box 401 may then copy/clone this idle signal and relay this to the original wireless device to prevent any self-destruction mechanism.

When a connection between the user controller device 102 and the wireless device 103 can be re-established, the user controller device 102 may reverse any corruption caused by the attacker in the wireless device 103 before terminating the communications between the attacking controller device 202 and the virtual clone of the wireless device, thereby avoiding any damage to the wireless device 103 due to a lack of a trigger signal being received by the wireless device 103.

In some embodiments, the network node may be configured to receive an attacking communication from the attacking controller device 202, and respond to the attacking communication as a virtual wireless device with an appropriate response related to the received attacking communication.

For example, if the attacking controller device 202 probes the wireless device 103 with an encrypted question, the wireless device 103 is seen as answering this encrypted riddle and the attacking controller 202 is still assured to be in control of the wireless device 103.

For the virtual wireless device, it may be necessary to monitor a threshold number of signals, to be sure one is able to answer the riddle.

In the example of the man-in-the-middle, the attacking controller device 202 communicates to the DI-Box 401, the DI-Box 401 forwards the riddle/test to the wireless device 103. The wireless device 103 answers to the DI-Box 401, which forwards the response to the attacking controller device 202. In such an example it may be a requirement that the attacker expects the response in a wider time limit, to allow this forwarding of messages.

In some embodiments, the network node analyses the intercepted communications to generate the attacker information. In some embodiments, the network node transmits the intercepted communications to an analysing node; and receives the attacker information from the analysing node. For example, a third party provider may provide decryption services in order to determine an encryption model be used to mimic attacking communications from the attacking controller device 202.

As mentioned earlier, in step 302 of FIG. 3, the network node modifies user communications from the user controller device 102 to the wireless device 103 with the attacker information to provide modified user communications. For example, the network node applies a device isolation mask (DI-Mask) to the communications originating from the user controller device 102 so that they mimic the communications from the attacking controller device 202. For example, where the attacker information comprises a source address of the attacking controller device 202, the network node may replace a source address of the user controller device 102 with the determined source address of the attacking controller device 202 in the modified user communications.

In some examples, the attacker information may comprise some encryption model to be applied to the user communications such that they are encrypted in the same manner as the attacker communications. In this example, step 302 may comprise encrypting the user communications using the attacker information.

As mentioned earlier, in step 303 of FIG. 3, the network node sends the modified user communications to the wireless device 103. These modified communications will appear as though they originate from the attacking controller device 202 and will therefore be accepted by the wireless device 103. The connection between the user controller device 102 and the wireless device 103 may therefore be re-established.

Once the connection between the user controller device 102 and the wireless device 103 has been re-established, the corruption of the wireless device 103 may be reversed such that the wireless device 103 will no longer only accept communications which appear to originate from the attacking controller device 202. The communications from the user controller device 102 may therefore no longer need to be modified by the attacker information in order to be accepted by the wireless device 103, and normal communications may resume.

Before initiating the procedure described with reference to FIG. 3, some embodiments of this disclosure may require that the network node first obtains user authentication confirming that a user 101 of the user controller device 102 is the rightful owner of the wireless device 103.

Several methods of obtaining user authentication are available. Some of these approaches are vulnerable, for example to loss of the authentication key or loss of a critical document. In the worst case scenario, public authorities may need to provide judgement of a user's ownership over a wireless device 103.

In some embodiments, the user 101 may be able to authenticate himself as the rightful owner of the wireless device 103 without being able to provide any acknowledgement on the wireless device 103 (due to his loss of control over the wireless device 103). For example, the wireless device 103 may be identified by International Mobile Equipment Identity (IMEI). In other embodiments, the wireless device may be identified by the International Mobile Subscriber Identity (IMSI). However, a virtual or physical SIM Card may be changed in the wireless device 103. Change of the IMSI may, in some examples, cause a number of difficulties, especially if the operator is changed along with the exchange of the SIM card.

It may be required that the ownership is binding, for example the IMEI of the wireless device 103 may be bound to the user 101, before an attack occurs. For example the ownership may be bound on initialization of a wireless device 103. Ownership of a wireless device 103 may require a handover mechanism in order to change the ownership if a wireless device 103 is disposed of by sale or transfer or any other method.

The user authentication mechanism may, in some examples, be a block chain based ownership documentation. With the use of a block chain, a user 101, with his unique identification, may create a transaction including the IMEI of the wireless device 103. The operator may then verify that the IMEI is not registered and if so may accept the transaction. The ownership of the wireless device 103 may then be documented for all operators. Thus, with an operators' confirmation, the block chain accepts the transaction. The basis of a block chain is that the community needs to accept transactions. It may be the case in some examples that not one operator can confirm a transaction, only initiate it, for all participants of the block chain to protest or confirm. If enough participants accept, the transaction is accepted.

The user authentication mechanism may comprise a user login. A user 101 may register to a web service of the operator with a token provided by the operator. The token may be sent digitally or by physical post to the user 101. With this token, the user 101 may be able to set up an account with the operator and register his/her wireless device(s) 103.

Alternatively, the user authentication mechanism may comprise paper based authentication. For example, the user 101 may provide a document as a proof of his ownership of the wireless device 103. This kind of document may be specified and be accepted by the operator.

FIG. 4 illustrates an example of a communications network according to some embodiments. FIG. 4 has several nodes in common with those discussed above in FIG. 1. In this example, FIG. 4 illustrates a lost user connection due to attacking communications from an attacking controller device 202.

In this example, the user 101 is aware that the connection to the wireless device 103 has been lost. The user 101 may therefore identify and authenticate himself as owner of the wireless device 103 to the network node, e.g. via the DI-Box 401, with a user authentication mechanism as described above.

A wireless device check may then be performed to verify that the wireless device 103 is connected and active. In other words, this check ensures that the wireless device 103 has been attacked, and is not just malfunctioning. The wireless device check may also disclose the frequency of the connection, the used APN, and the targeted server of the data connection, i.e. the attacker's server 203.

Figure 2:
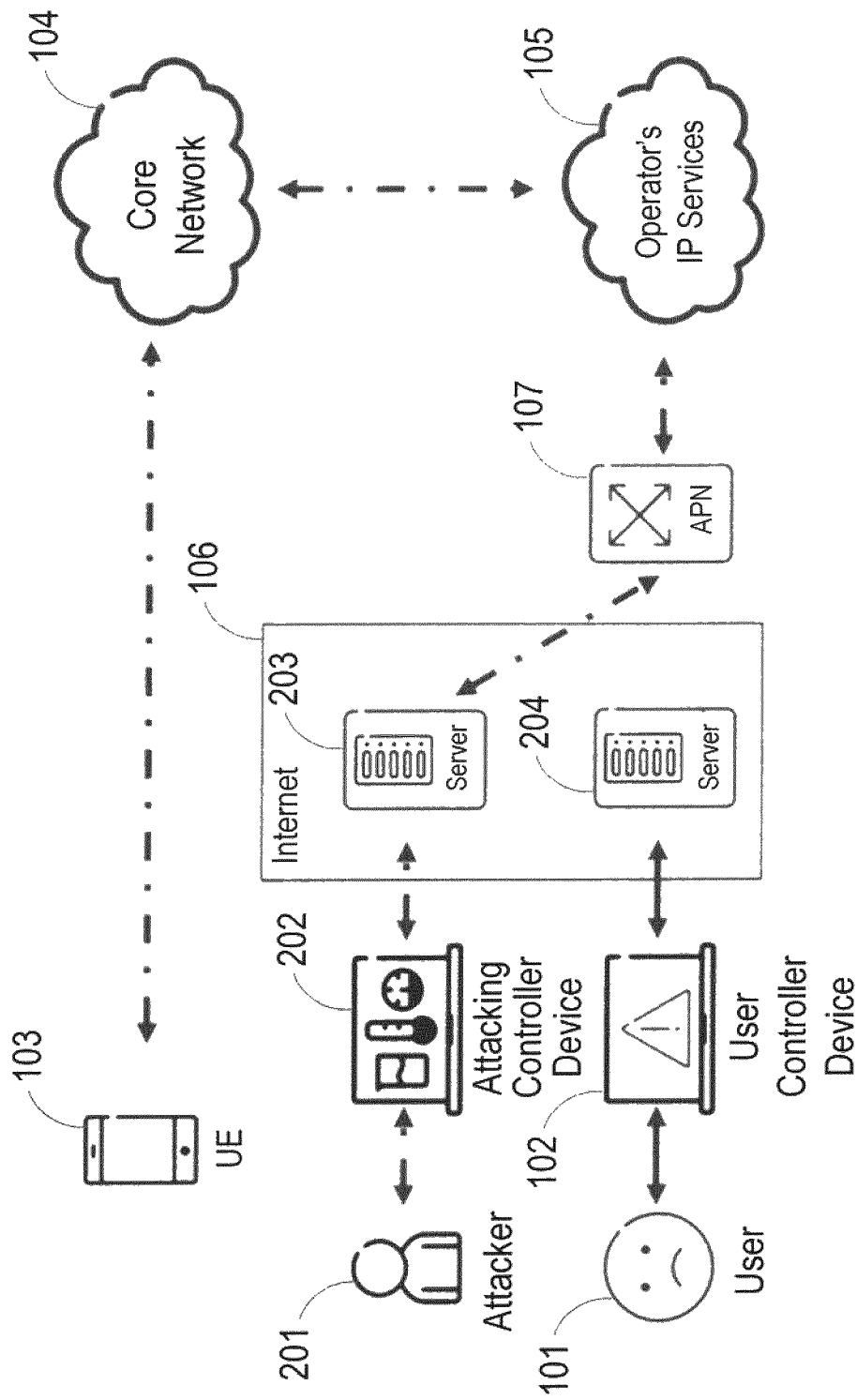
FIG. 2 illustrates a lost connection between a user and a wireless device.

However, in contrast to FIG. 2, the attacking communications are in this embodiment being routed through a predetermined network gateway, i.e. the DI-Box 401, which, in this embodiment, is functioning as a PGW. By routing the communications between the wireless device 103 and the attacking controller device 202 through the DI-Box 401, these communications can be intercepted for analysis. In other words, FIG. 4 relates to a status of collecting intelligence, for example whereby the network node, e.g. the DI-Box, is active and is analyzing attacker communications to the wireless device 103 and communications from the wireless device 103 to the attacker.

The routing of all of the communications between the wireless device 103 and the attacking controller device 202 may be maintained even if the wireless device 103 is moving or switching carriers. The network may be aware of the potential that the wireless device 103 is under attack and may therefore ensure that all traffic is routed through the DI-Box 401. Even if the wireless device 103 roams to a different operator, the operators may communicate with one another that because of the status of a particular wireless device 103, all traffic to and from that wireless device 103 should be routed through a particular gateway, i.e. the DI-Box 401.

There are several mechanisms with which the network may intercept the communications to and from the wireless device 103. To prevent reducing the efficiency of the PGW, e.g. through Deep Packet Inspection, a feasible approach is, to use a specific PGW for analysis and isolation. For example, the embodiment of FIG. 4 utilizes a DI-Box 401 which includes the basic functionality of the PGW and specific device isolation functions, for example, the ability to terminate attacking communications at the DI-Box 401.

The incoming traffic may be caught with firewall mechanics as the DI-Box 401 is the wireless device's PGW, and should therefore receive all incoming traffic to the wireless device 103. In some embodiments, the DI-Box 401 may set up virtual wireless devices and register them with the network. The incoming traffic may then be caught in the DI-Box 401 by updating the wireless device's 103 location in the radio network to a virtual location of one of the new virtual wireless devices.

The incoming traffic from the attacker may also be logged for analysis and could either be caught/stopped by the DI-Box 401 or be diverted to a virtual wireless device. Diverting to a virtual wireless device, maybe even a virtual clone of the original wireless device 103, may be used as a highly sophisticated analysis and counter attack tool, or simply to hide from the attacker 201 that his attack has been detected.

The communications to and from the wireless device 103, as well as signaling, may be routed through the DI-Box 401 due to its function as PGW. Signaling events, which may be necessary to maintain the connection, may be handled accordingly by the DI-Box 401. The core network 104 may be aware of the wireless device 103 and its isolation state. For example, if the wireless device 103 changes its location or switches carrier, the connection may still be routed through to the DI-Box 401. This may be necessary if the wireless device 103 is moving and changing to a roaming connection or is switching the carrier it is using. In the future, the attacker 201 may even try to bring in a new, virtual SIM. In that case, the wireless device 103 may be identified by its Device ID/IMEI, and the isolation may be performed in a similar way, but may require handover arrangements through different operators. There may therefore be an agreement on a protocol between operators to handle such incidents.

By using a separate PGW to intercept communications the network enables easy interception of all ingoing and outgoing traffic to the wireless device 103 due to the PGW's function as anchor for any data connection between the wireless device 103 and the Internet 106.

If a particular communications network is structured differently, then any anchor point of the data connection may be a feasible point for the DI-Box to be positioned.

The DI-Box functionality may therefore be positioned in any suitable connection point where there is no possibility to bypass its functions. However, providing the DI-Box as part of an existing component of the network, for example a PGW, reduces the initial effort to integrate it into an existing Network.

The DI-Box 401 may be configured as the PGW for the wireless device 103 using control signaling in the HSS. To initiate the procedure, specific enhancements within the MME and a Domain Name System (DNS) may occur.

In other networks, the configuration of the PGW may occur in the Home Location Register (HLR) and the Serving General Packet Radio Service (GPRS) Support Node (SGSN).

If the PGW for the wireless device 103 cannot be switched to the predetermined network gateway, for example the DI-Box, through the MME, the PCRF may be used to enable the switch of PGW. For example, different PGWs may be registered for use with a particular wireless device for different quality settings. Therefore the PCRF may be able to change a quality setting for the communications to the wireless device 103 in order to switch the PGW for the wireless device 103 to the predetermined network gateway, for example the DI-Box 401.

As the DI-Box 401 may therefore be the PGW for communications to and from the wireless device 103, the DI-Box 401 may obtain attacker information based on intercepted communications between the wireless device 103 and the attacking controller device 202.

The attacker information may comprise information regarding: whether or not the connection still terminates at the operator, which APN it uses and/or any other information relating to the intercepted communications. The DI-Box 401 may analyze the outgoing data connections, the frequency, the size of the packages, as well as the addresses any communications are sent to.

It may be desirable to do further and/or later analysis of the intercepted communications. A feature for duplicating and saving the attacker information may therefore also be optionally activated. For example, the saved attacker information may be used to later blacklist or otherwise block the attacking controller device 202 from using the operator's IP services 105, or as evidence for use in action to be taken against an attacker.

For any outgoing intercepted communications, information such as the occurrence, timestamp, receiver, and/or package size may be recorded as part of the attacker information. For any incoming intercepted communications, the attacker information may comprise for example the point of origin, occurrence, timestamp, and/or package size. The collected information may be aggregated and provided through a device isolator interface 403 to the user 101. The device isolator interface 403 is a form of user controller device which may be used to re-establish a connection to the wireless device 103. In some embodiments, the user controller device 102 may comprise the device isolator interface 403. The device isolator interface 403 can be provided by other methods. For example, in some embodiments the user controller device 102 can access the device isolator interface 403, either directly or through another computer. The device isolator interface 403 may be an interaction interface provided by the operator/network.

The user 101 may then determine how to proceed. For example, the user 101 may determine whether or not to enter an isolation phase in which the wireless device 103 is isolated from any attacking communications. In some embodiments, the DI-Box 401 determines whether or not to enter the isolation phase with or without sending the attacker information to the user 101. If it is deemed necessary, either by the user 101 or the DI-Box 401, the wireless device may be isolated from the attacker as shown in FIG. 5.

Figure 5:
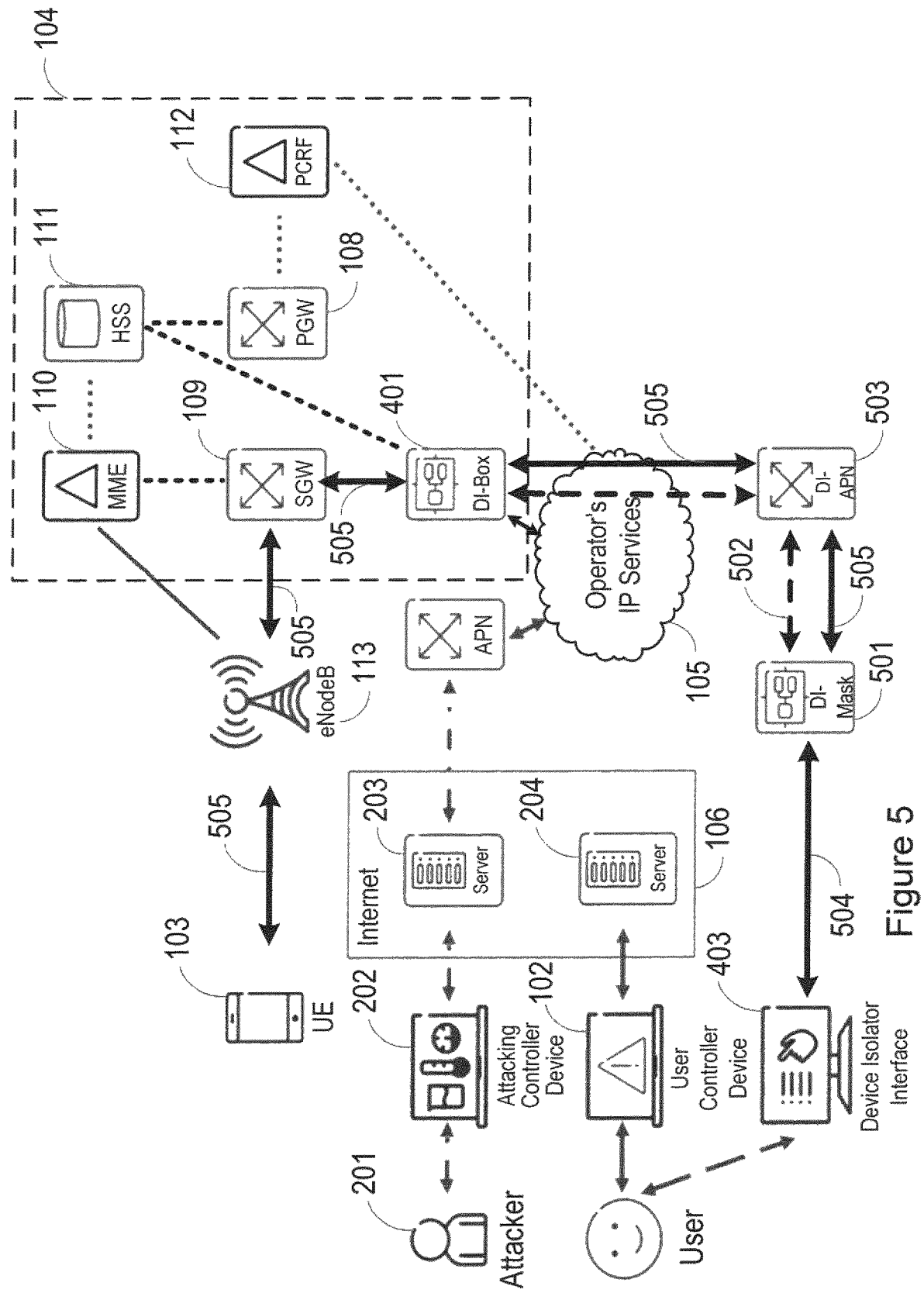
FIG. 5 illustrates an example of a communications network in which the attacking communications have been terminated at a device isolator, and the user communications with the wireless device have been re-established.

FIG. 5 illustrates an example of a communications network in which the attacking communications have been terminated at the DI-Box 401, and the user communications with the wireless device 103 have been re-established.

In this example, the DI-Box 401 has routed all of the attacking communications to and from the wireless device 103 through the gateway of the DI-Box 401. The skilled person will appreciate that some other network node, for example the MME 110 or the HSS 111 of the core network 104, may provide the necessary changes in the network communication to isolate the wireless device and route the traffic through the DI-Box 401.

The DI-Box 401, in this example, has then obtained the attacker information, either by analysis of the intercepted communications or by transmitting the intercepted communications to an external node for analysis. The DI-Box 401 may then determine, either individually or in response to a control signal from the user controller device 102, that the wireless device 103 should be isolated from the communications from the attacking controller device 202. In response to this determination, the DI-Box 401 may be configured to terminate the attacking communications at the DI-Box 401.

The DI-Box 401 may therefore now catch and terminate all outgoing traffic from the wireless device 103 and all incoming traffic to the wireless device 103. The attacking controller device 202 may therefore no longer be communicating with the wireless device 103.

Once the attacker information has been analyzed, a DI-Mask 501 may be created which can be applied to any communications in order to modify the communications such that they mimic communications from the attacking controller device.

In the example of FIG. 5, the DI-Mask is illustrated as a separate node 501. However, it will be appreciated that the DI-Mask may be applied within the DI-Box 401 as the communications pass through the DI-Box 401. Alternatively, in some embodiments, the DI-Mask may be applied by the user controller device 102 or the device isolator interface 403.

In the example of FIG. 5, the DI-Mask performs the three steps of the method of FIG. 3.

In other words, the DI-Mask 501 obtains the attacker information 502 from the DI-Box 401, potentially via an APN 503. It may modify user communications 504 received via the device isolator interface 403 with the attacker information. For example, as described above with reference to FIG. 3 the attacker information 502 may comprise a source address of the attacking controller device 202, and the DI-Mask 501 may therefore replace a source address of the device isolator interface 403 with the determined source address of the attacking controller device 202 in the modified user communications 505. It will be appreciated that the source address of the device isolator interface 403 may, in some embodiments, be equivalent to the source address of the user controller device 102.

In some embodiments, the DI-Mask 501 may be able to synthesize packages with an artificial point of origin/origination IP & Port, as well as other features of the packages content. For example, device names, MAC-Address, or any content which may need to be mimicked accordingly.

These modified communications 505 may then be sent by the DI-Mask 501 to the wireless device 103. In this example, the modified communications 505 are sent via the DI-Box 401, a SGW 109 of the core network and the base station 113 to the wireless device 103.

As these modified user communications 505 have been modified such that they appear to originate at the attacking controller device 202, the wireless device 103 may accept these modified user communications 505. These modified user communications 505 may therefore re-establish a connection between the user and the wireless device 103.

Therefore, as a connection between the wireless device 103 and the user controller device has been re-established, the user 101 may undo the corruption which caused the wireless device 103 to only accept communications which appear to originate from the attacking controller device 202. Once this corruption has been reversed, the device isolation may be stopped and normal communication may be resumed. In other words, it may no longer be necessary to route all communications to and from the wireless device through the DI-Box 401, nor to modify the user communications with the attacker information.

For more complex corruption it might be that a third party, for example a security specialist, is used to analyse the attack and the communications, and additional measures may be used to regain control of the wireless device 103. In any case, the user 101 may hand over communications with the wireless device 103 to a third party in order to address the corruption of the wireless device 103, before normal communications may be resumed.

In some embodiments, the attacker's connection details, as well as specific information about the type of attack, may be further analyzed. If deemed necessary further actions could be taken, for example, blacklisting the attacker and blocking its traffic to the operator's IP services.

A feature to record the complete analysis, intelligence and isolation phase as well as adapting it accordingly might be needed. It should be able to reproduce the generic steps enhanced with the specific measures, i.e. the recovering of a device based on the method steps described above (which might include the analyses and the breaking of any encryption, resetting and reconfiguring the device and installing software on the device). This might be needed if several devices are behaving similar and there is a need to execute the regain process several times. By doing so, recovering several devices from the same attack can be carried out easier and faster.

Figure 6:
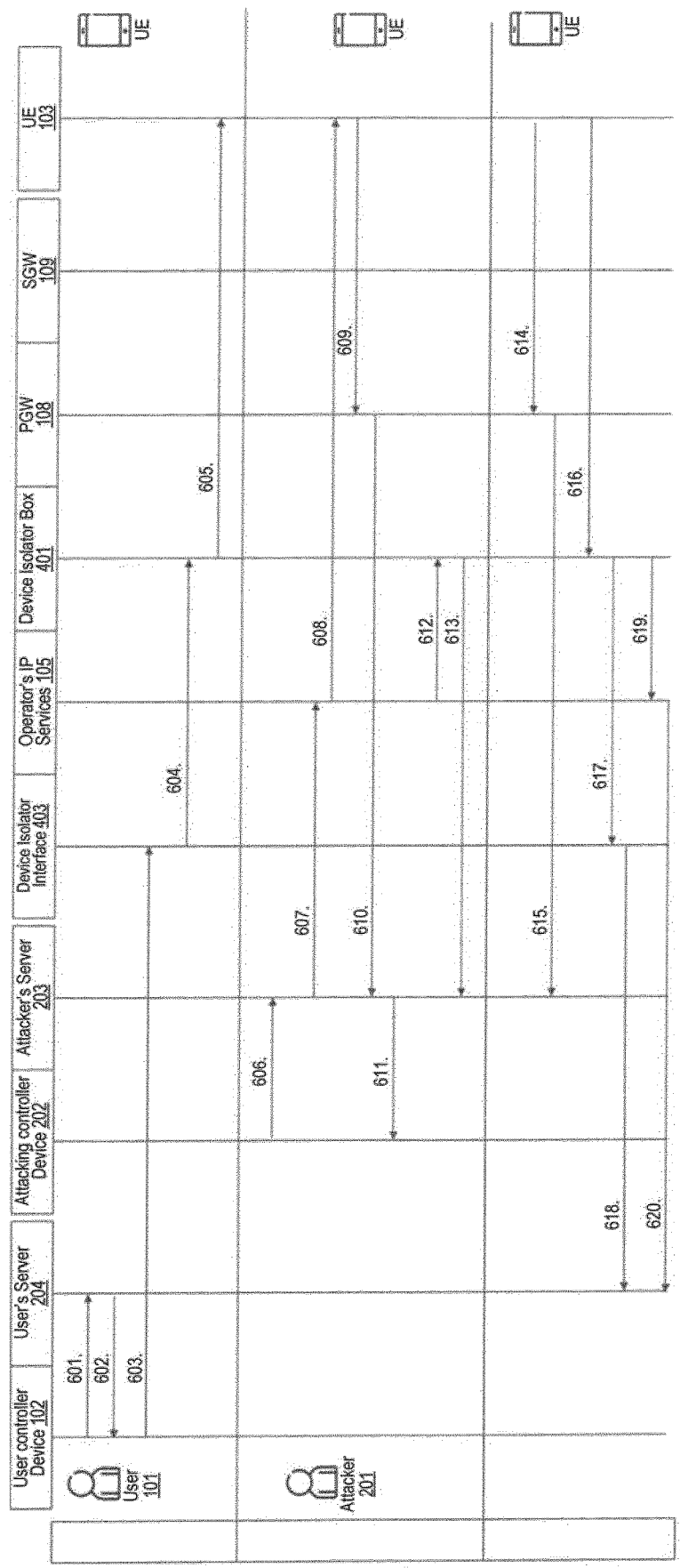
FIG. 6 is a signaling diagram illustrating an example of the signaling between the different nodes in the communications network according to some embodiments.

FIG. 6 is a signaling diagram illustrating an example of the signaling between the different nodes in the communications network.

In this example, the user 101 is already aware that it is unable to connect to the wireless device 103. In signaling 601, the user 101 connects to the user's server and requests feedback as to whether the wireless device 103 is corrupted.

In signaling 602, the user's server 204 may then feedback to user that the wireless device 103 is corrupted and inaccessible.

In signaling 603, the user 101 may then initiate device isolation through the device isolator interface 403, which may be part of the user controller device 102. The signaling 603 may also comprise some authentication mechanism authenticating the user 101 as the owner of the wireless device 103.

The DI-Box 401 may take over the PGW functionality of the core network for the wireless device 103. (The HSS may register the DI-Box 401 as the PGW for the wireless device 103 and may force an update to register the DI-Box 401 as the new PGW).

In signaling 604, the device isolator interface 403 may therefore connect through the operator's IP services 105 to the DI-Box 401.

In signaling 605, the DI-Box 401 may then relay the signals from the user controller device 102, via the PGW 108 through the SGW 109 to the wireless device 103. As described above, the user's communications are modified such that they appear to originate at the attacking controller device 202. This modification may be performed at the user controller device 102, the DI-Box 401 or at a separate DI-Mask node 501.

During this time, in signaling 606, the attacker 201 may be accessing his/her own server 203 using the attacking controller device 202.

In signaling 607, the attacker's server 203 may then connect through to the operator's IP services 105.

As the DI-Box 401 has not yet been reconfigured as the PGW for communications to and from the wireless device 103, the operator's IP services may then, in signaling 608, relay the communications to the wireless device 103 via the PGW 108.

In signaling 609, the wireless device 103 may then respond to the attacker's communications, again via the PGW 108 which may, in signaling 610, relay the response back to the attacker's server 203.

In signaling 611, the Attacker's Server 203 may then forward the wireless device's 103 response to the attacking controller device 202.

However, in the case where the DI-Box 401 has been configured as the PGW for communications to and from the wireless device 103, the signaling 608 to 610 may not occur.

Instead, the operator's IP services 105 may, in signaling 612, connect to a virtual wireless device, registered by the DI-Box 401. In some embodiments, the traffic may be forwarded to the wireless device 103, for example, if a trigger signal is needed to be maintained. However, in this example, the traffic is terminated at the DI-Box 401.

In signaling 613, the DI-Box 401 may then reply to the attacking controller device 202 via the attacker's server 203 with an appropriate response to the attacking communication. By responding in some appropriate way, the DI-Box 401 may hide the detection of the attack from the attacking controller device 202.

In signaling 611, the attacker's server 203 may then relay the response to the attacking controller device 202 in a similar way.

When the DI-Box 401 is not configured as the PGW for the communications to and from the wireless device 103, the wireless device 103 may, in signaling 614, send data through the SGW 109 to the PGW 108.

In signaling 615, the PGW 108 may then relay this data to the attacker's server 203.

However, when the DI-Box 401 is reconfigured as the PGW for the communications to and from the wireless device 103, the signaling 614 and 615 may not occur. Instead, the DI-Box 401 acts as the PGW and the wireless device 103, in signaling 616, sends data to the DI-Box 401.

In signaling 617, the DI-Box 401 may then either forward the traffic to the device isolator interface, which may analyze the intercepted communications to generate the attacker information, or the DI-Box 401 may analyze the intercepted communication to generate the attacker information.

In signaling 618, the device isolator interface 403 may then forward either the intercepted communications, or the attacker information to the user's server 204. Alternatively, the DI-Box 401 may simply address the data received from the wireless device 103 to the user's server 204 and may, in signaling 619, relay the data to the operator's IP servers 105, to, in signaling 620, forward to the user's server 204.

Figure 7:
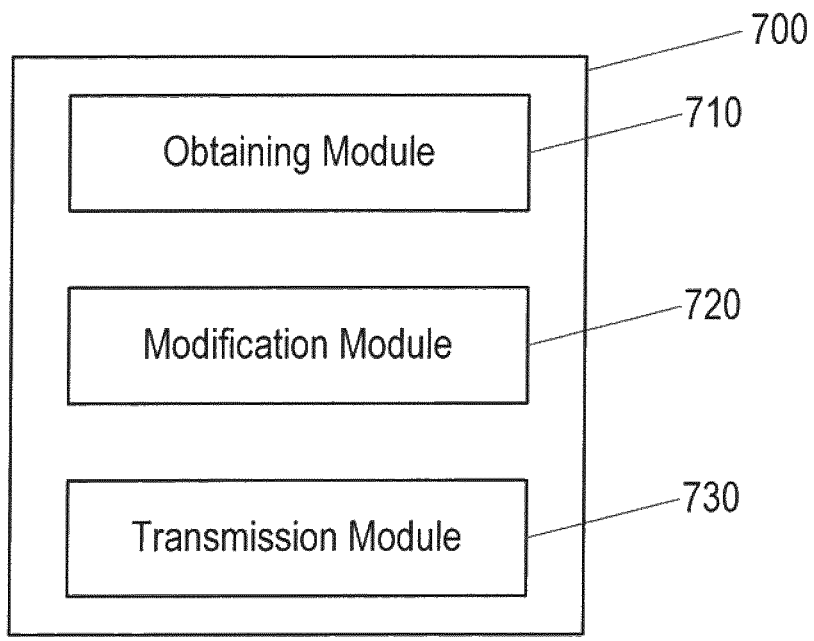
FIG. 7 illustrates a network node according to some embodiments.

FIG. 7 illustrates a network node 700 according to some embodiments. The network node 700 is configured to re-establish a connection between a user controller device and a wireless device in a wireless communications network, wherein the wireless device has been corrupted such that it will only accept communications which appear to originate from an attacking controller device. The network node comprises an obtaining module 710 configured to obtain attacker information based on intercepted communications between the wireless device and the attacking controller device, wherein the attacker information can be used to modify communications such that modified communications mimic communications from the attacking controller device. The network node 700 also comprises a modification module 720 configured to modify user communications from the user controller device to the wireless device with the attacker information. The network node 700 further comprises a transmission module 730 configured to send the modified user communications to the wireless device.

Figure 8:
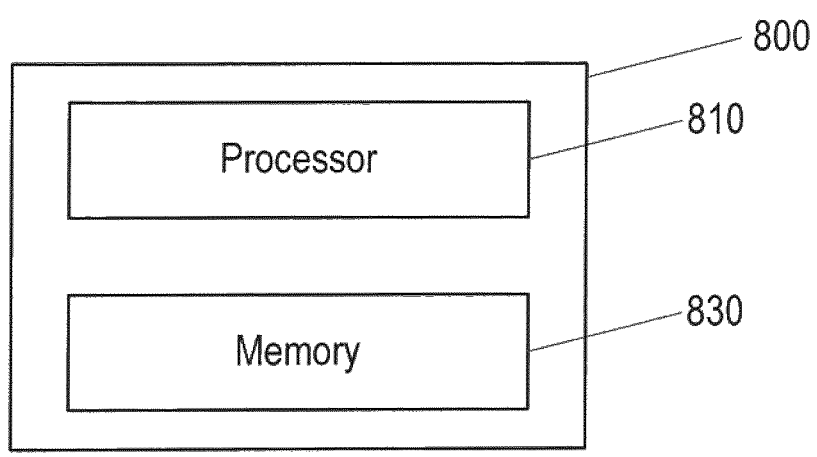
FIG. 8 illustrates a network node according to some embodiments.

FIG. 8 illustrates a network node according to some embodiments. The network node 800 is configured to re-establish a connection between a user controller device and a wireless device in a wireless communications network, wherein the wireless device has been corrupted such that it will only accept communications which appear to originate from an attacking controller device. The network node 800 comprises a processor 810 and a memory 830, said memory 830 containing instructions executable by said processor 810, wherein said processor 810 is operative to: obtain attacker information based on intercepted communications between the wireless device and the attacking controller device, wherein the attacker information can be used to modify communications such that modified communications mimic communications from the attacking controller device. The processor 810 being further operable to modify user communications from the user controller device to the wireless device with the attacker information; and send the modified user communications to the wireless device.

There is therefore provided methods and apparatus for re-establishing a connection between a user controller device and a wireless device in a wireless communications network, wherein the wireless device has been corrupted such that it will only accept communications which appear to originate from an attacking controller device.

In particular, if a user recognizes one or more devices as corrupted or non-responding he can initiate a device check. With that information, the user can decide to isolate the wireless device from the attacking communications. A DI-Box, or any predetermined network gateway, may then capture the wireless devices outgoing and ingoing communications and enable the user to reroute the wireless device's traffic as well as the ingoing traffic.

Furthermore, if the wireless device is no longer accepting the signals from the user controller device, the method may mask the user's communications such that they appear to originate from the attacking controller device. This allows a user to regain controller of the wireless device without having to physically access the wireless device.

This re-establishment of a connection between the user control device and the wireless device may be reproduced easily. Therefore, regaining the control of multiple devices is much more efficient than physically accessing them.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a network node, of re-establishing a connection between a user controller device and a corrupted wireless device in a wireless communications network, wherein the corrupted wireless device has been corrupted such that it will only accept communications which appear to originate from an attacking controller device, the method comprising:
   obtaining attacker information based on intercepted communications between the corrupted wireless device and the attacking controller device, wherein the attacker information can be used to modify communications such that modified communications mimic communications from the attacking controller device;
   modifying user communications from the user controller device to the corrupted wireless device with the attacker information; and
   re-establishing the connection between the user controller device and the corrupted wireless device, wherein re-establishing the connection comprises sending the modified user communications to the corrupted wireless device.

2. The method of claim 1, further comprising intercepting communications between the corrupted wireless device and the attacking controller device.

3. The method of claim 2, wherein the intercepting comprises routing all communications to and from the corrupted wireless device to a predetermined network gateway.

4. The method of claim 3, wherein the network node comprises the predetermined network gateway.

5. The method of claim 3, further comprising terminating traffic between the corrupted wireless device and the attacking controller device in the predetermined network gateway.

6. The method of claim 3, wherein the predetermined network gateway is a packet data gateway.

7. The method of claim 3, further comprising receiving the intercepted communications from the predetermined network gateway.

8. The method of claim 1, further comprising analyzing the intercepted communications to generate the attacker information.

9. The method of claim 1, further comprising:
   receiving an attacking communication from the attacking controller device; and
   responding to the attacking communication as a virtual wireless device with an appropriate response related to the received attacking communication.

10. The method of claim 1, wherein the obtaining comprises determining, from the intercepted communications, a source address of the attacking controller device.

11. The method of claim 10, wherein the modifying comprises replacing a source address of the user controller device with the determined source address of the attacking controller device in the modified user communications.

12. The method of claim 1, further comprising analyzing the intercepted communications to determine an encryption model to be used to mimic attacking communications from the attacking controller device.

13. The method of claim 1, further comprising:
   transmitting the intercepted communications to an analyzing node; and
   receiving the attacker information from the analyzing node.

14. The method of claim 1, further comprising:
   identifying, in the intercepted communications, a trigger signal necessary to maintain proper operation of the corrupted wireless device; and
   transmitting a signal derived from the trigger signal to the corrupted wireless device.

15. The method of claim 14, wherein the transmitting comprises forwarding the trigger signal to the corrupted wireless device.

16. The method of claim 1, further comprising performing the obtaining, the modifying, and the sending in response to obtaining user authentication confirming that a user of the user controller device is the rightful owner of the corrupted wireless device.

17. A network node for re-establishing a connection between a user controller device and a corrupted wireless device in a wireless communications network, wherein the corrupted wireless device has been corrupted such that it will only accept communications which appear to originate from an attacking controller device; the network node comprising:
   processing circuitry;
   memory containing instructions executable by the processing circuitry whereby the network node is operative to:
      obtain attacker information based on intercepted communications between the corrupted wireless device and the attacking controller device, wherein the attacker information can be used to modify communications such that modified communications mimic communications from the attacking controller device;

modify user communications from the user controller device to the corrupted wireless device with the attacker information; and re-establish the connection between the user controller device and the corrupted wireless device by send sending the modified user communications to the corrupted wireless device.

18. The network node of claim 17, wherein the instructions are such that the network node is operative to intercept communications between the corrupted wireless device and the attacking controller device.

19. The network node of claim 17, wherein the instructions are such that the network node is operative to analyze the intercepted communications to generate the attacker information.

20. A non-transitory computer readable recording medium storing a computer program product for controlling a network node for re-establishing a connection between a user controller device and a corrupted wireless device in a wireless communications network, wherein the corrupted wireless device has been corrupted such that it will only accept communications which appear to originate from an attacking controller device, the computer program product comprising program instructions which, when run on processing circuitry of the network node, causes the network node to:

obtain attacker information based on intercepted communications between the corrupted wireless device and the attacking controller device, wherein the attacker information can be used to modify communications such that modified communications mimic communications from the attacking controller device;

modify user communications from the user controller device to the corrupted wireless device with the attacker information; and re-establish the connection between the user controller device and the corrupted wireless device by sending the modified user communications to the corrupted wireless device.

* * * * *